(12) United States Patent
Gunn et al.

(10) Patent No.: US 7,016,338 B2
(45) Date of Patent: Mar. 21, 2006

(54) METHODS, SYSTEM AND GATEWAY FOR ACCESSING FEATURES OF EQUIPMENT CONNECTED TO A PSTN

(75) Inventors: Thomas Gunn, Burnaby (CA); Raymond Ko, Vancouver (CA)

(73) Assignee: Nokia Mobile Phones, Ltd., Espoo (FI)

( * ) Notice: Subject to any disclaimer, the term of this patent is extended or adjusted under 35 U.S.C. 154(b) by 645 days.

(21) Appl. No.: 09/739,082

(22) Filed: Dec. 15, 2000

(65) Prior Publication Data

US 2002/0075847 A1    Jun. 20, 2002

(51) Int. Cl.
*H04L 12/56* (2006.01)
(52) U.S. Cl. ...................................... 370/352; 370/401
(58) Field of Classification Search ................ 370/230, 370/238, 252, 352–356, 401, 338
See application file for complete search history.

(56) References Cited

U.S. PATENT DOCUMENTS

| | | | | |
|---|---|---|---|---|
| 5,805,587 | A * | 9/1998 | Norris et al. ................ | 370/352 |
| 5,917,817 | A * | 6/1999 | Dunn et al. .................. | 370/352 |
| 6,212,261 | B1 * | 4/2001 | Meubus et al. .......... | 379/88.12 |
| 6,253,249 | B1 * | 6/2001 | Belzile ........................ | 709/249 |
| 6,304,566 | B1 * | 10/2001 | Schessel ..................... | 370/354 |
| 6,317,488 | B1 * | 11/2001 | DePond et al. .......... | 379/93.35 |
| 6,333,931 | B1 * | 12/2001 | LaPier et al. ............... | 370/385 |
| 6,337,850 | B1 * | 1/2002 | Nakano et al. ............. | 370/230 |
| 6,377,668 | B1 * | 4/2002 | Smock et al. .......... | 379/142.08 |
| 6,381,320 | B1 * | 4/2002 | Creamer et al. ....... | 379/201.01 |
| 6,411,704 | B1 * | 6/2002 | Pelletier et al. ............. | 379/230 |
| 6,515,996 | B1 * | 2/2003 | Tonnby et al. ............... | 370/352 |
| 6,584,185 | B1 * | 6/2003 | Nixon .................... | 379/201.01 |
| 6,661,785 | B1 * | 12/2003 | Zhang et al. ................ | 370/352 |
| 6,757,266 | B1 | 6/2004 | Hundscheidt | |

FOREIGN PATENT DOCUMENTS

EP    0966145 A2 * 12/1999

OTHER PUBLICATIONS

IP Telephony, "IP Centrex Application", *Voice on the Net (VON) Conference*, Fall '99, Sep. 27-30, 1999, Atlanta, Georgia USA.
IP Telephony, "IPRelay—Bridge IP Telephony to the PBX—including remote sites", *Voice on the Net (VON) Conference*, Fall '99, Sep. 27-30, 1999, Atlanta, Georgia USA.
IP Pulse, *Voice and Fax over IP News*, "Nokia Introduces New VoIP Gateway Products", Oct. 7, 1999.
Businesswire, Sep. 28, 1999, "IP Relay expands the Nokia End to End IP Telephony Solution; Unique two-line personal gateway provides the ultimate entry point for business looking to leverage IP Telephony".

* cited by examiner

*Primary Examiner*—Zarni Maung
*Assistant Examiner*—Van Nguyen

(57) ABSTRACT

An IP telephony network is made connectable to an existing PBX or other equipment connected to a PSTN via an IP telephone gateway/shuttle and relay and a remote hook flash allows a user with a remote IP terminal or POTS phone access to the features available on the existing PBX or other equipment.

11 Claims, 2 Drawing Sheets hookflash = onhook for 200ms and then offhook again

METHODS, SYSTEM AND GATEWAY FOR ACCESSING FEATURES OF EQUIPMENT CONNECTED TO A PSTN

TECHNICAL FIELD

The present invention relates to IP telephony and, more particularly, to enabling IP telephony users transparent access to features of a remote private automatic branch exchange (PBX) or similar equipment (centrex, KTS, EKTS or hybrid systems) offering features in addition to a telephone connection, which equipment is connected to the public switched telephone network (PSTN).

DISCUSSION OF RELATED ART

IP telephony is an efficient, economical and effective communications solution that enables voice and fax over IP networks. Many small and medium-sized enterprises are eager to deploy IP telephony technology and begin realizing the benefits of voice over IP (VoIP).

However, many of these organizations rely upon proprietary private branch exchange (PBX) centrex, KTS, EKTS or similar equipment offering features in addition to a simple telephone connection to meet current telecommunications needs. Most have made a considerable investment in PBX or like equipment and are fully satisfied with the functional advantages it has to offer. Realizing the benefits of new IP telephony solutions in remote offices or for teleworkers is appealing, but the disruption and expense of changing an entire infrastructure is less than desirable.

DISCLOSURE OF INVENTION

An object of the present invention is to provide a bridging of IP telephony to the public switched telephone network and in particular to existing equipment offering features in addition to a simple telephone connection, such as PBXs, centrex or KTS systems.

According to a first aspect of the present invention, a method comprises the steps of communicating between an internet protocol (IP) device over an IP network and a bridge connected to non-IP equipment providing telephony connections as well as telephony-related features, which equipment is connected to a public switched telephone network (PSTN), by signaling from said IP device to said bridge with an access code indicative of a feature of said equipment and by converting said access code to a non-IP protocol for accessing said feature of said non-IP equipment by said IP device.

In further accord with the first aspect of the invention, said signaling with an access code, a remote hookflash is signaled from said IP device to said bridge. The remote hookflash may be signaled from a non-IP device connected to said IP device.

According to a second aspect of the present invention, a method for accessing a feature of equipment connected to a public switched telephone network with an access signal code corresponding to said feature, comprises the steps of initiating said access code signal from a terminal (22, 24, 26) remote from said equipment, transmitting said access code signal as a packetized signal over an internet protocol (IP) network to a relay device (10), and converting said packetized access code signal at said relay device to a non-IP access code signal for said accessing said feature.

In further accord with the second aspect of the invention, said method further comprises the steps of signaling from said terminal to said relay device with a packetized hookflash signal before said steps of initiating and transmitting said access code signal and converting said packetized hookflash signal at said relay device to a non-IP hookflash signal for signaling said equipment before accessing said feature with said access code signal. The hookflash signal and the access code may be signaled from an IP device connected to said terminal, i.e., intermediate the IP network and the terminal.

According to a third aspect of the invention, a telecommunications system having equipment providing telephony connections as well as telephony-related features accessible to a plurality of telephones connected as extensions thereof, said equipment for connection to a public switched telephone network (PSTN), further comprises an internet protocol (IP) relay device (10) connected as at least one extension of said equipment for converting at least voice and signaling between said PSTN and one or more IP devices (18, 20, 26) in communication with said IP relay device over an IP network, said one or more IP devices for providing a remote access signal to said IP relay device over said IP network for accessing said of features said equipment as said at least one extension.

According further to the third aspect of the invention, said remote access signal is a remote hookflash signal that is relayed from said IP relay device to said equipment. The remote hookflash signal may be initiated at a terminal connected to one of the IP devices According still further to the third aspect of the invention, said accessing said equipment is for accessing a POTS terminal (30) of said PSTN.

Still further in accord with the third aspect of the invention, said accessing said equipment is for accessing a POTS telephone (30) over said PSTN network from a terminal connected to one of said IP devices.

According to a fourth aspect of the invention, a gateway, comprises means responsive to a remote hookflash signal from a remote device over an internet protocol (IP) network for providing said hookflash signal in a non-IP format to equipment connected to a public switched telephone network (PSTN) for providing telephony connections as well as telephony-related features to telephones connected to said equipment; and means responsive, subsequent to said hookflash signal, to an access code from said remote device over said IP network for providing said access code to said equipment in a non-IP format indicative of a feature provided by said equipment to extensions thereof whereby said gateway enables said remote device to gain access to said feature remotely over said IP network.

The present invention permits remote offices to connect as off-premise extensions of non-IP equipment offering features in addition to simple telephony connections, such as a PBX/centrex/KTS/EKTS/hybrid equipment connected to the PSTN and to thereby effectively exploit IP telephony technology. Because remote users appear to the PBX/centrex/KTS system as extensions, they have access to all the PBX/centrex/KTS system's extension features. It is a key building block for allowing seamless integration of the IP telephony features with PBX or PSTN-based features.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
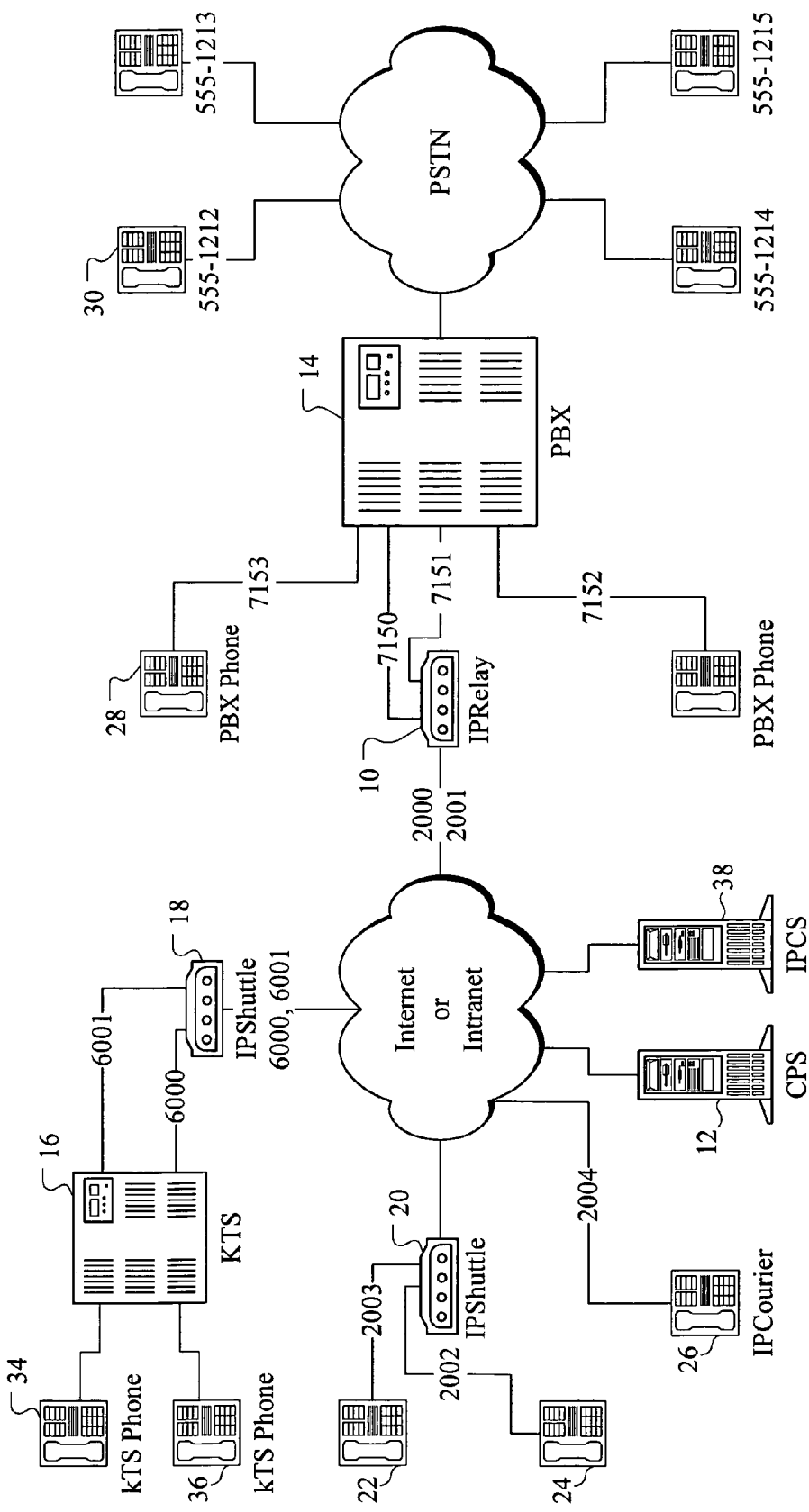
FIG. 1 shows a typical environment in which the invention is shown used as an exemplary two-line PBX gateway to provide voice over IP service to remote locations.

FIG. 1 illustrates a typical environment that a device 10 such as a two-line PBX gateway (IPRelay) to provide voice over IP service to remote locations. In the scenario shown in FIG. 1, the PBX gateway (IPRelay) is set up as two clients of a Call Processor Server (CPS) 12 and is connected to a PBX 14 as two phones. The PBX sees each line as a phone with extension numbers 7150 and 7151 respectively and the CPS sees the gateway (IPRelay) as two clients and respectively assigned each gateway line the CPS extensions 2000 and 2001.

A Telephone System (KTS) 16 has a device 18 called IPShuttle connected to it via two analog phone lines using a RJ-11 POTS interface to the KTS and a RJ-45 interface to a local LAN or to the Internet via a cable or xDSL modem (not shown). A key telephone system (KTS) is generally a smaller version of a PBX that gives direct access to the telephone lines. Traditionally, key systems are not switches, and a user manually presses a button on the telephone to select a specific central office line to engage. The IPShuttle device 18 has been assigned CPS extension 6000 to line 1 and 6001 to line 2. A second, standalone IP shuttle device 20 has been assigned CPS extension 2002 to line 1 and 2003 to line 2 for connection to a pair of POTS terminals 22, 24 (analog telephones). An IPCourier telephone device 26, which is an IP-ready telephone, is assigned extension 2004. Various call establishment scenarios will now be discussed.

The procedures for IPCourier device 26 or an IPShuttle device 18, 20 to call a PBX or PSTN phone are exactly the same. Suppose that the user of the IPCourier device 26 at extension 2004 wishes to call a PBX phone 28 at extension 7153 as shown in FIG. 1 or a PSTN number 555-1212 assigned to a POTS telephone 30 connected to the PSTN which is in turn connected to the PBX. In this scenario, for instance, the user of the IPCourier device 26 places a call to one of the IPRelay device 10 extensions, e.g., extension 2000. Upon receiving the incoming call, the IPRelay device 10 automatically goes off hook and in turn answers the incoming call. At this point, the IPCourier device 26 has established a connection and opened a UDP (User Datagram Protocol) audio channel with the IPRelay device 10. When the IPRelay device 10 went off hook, it drew dial tones from the PBX 14 and the dial tones were transmitted via the audio channel to the IPCourier device 26 and hence to the user. When the user hears the dial tones, he or she then dials the PBX extension 7153 or the PSTN number 555-1212. As the digits are being dialed, the IPCourier device 26 detects the DTMF tones and formats them into Q.931 information messages which are then transmitted via the CPS 12 to the IPRelay. Q.931 is a message-oriented signaling protocol, also called ITU-T Recommendation I.451. Upon receiving the Q.931 information messages, the IPRelay device 10 regenerates the DTMF tones and sends them to line 1, the line that is connected to PBX extension 7150, which in turn dials the PBX extension 7153 or the PSTN number 555-1212. When PBX phone 28 at extension 7153 or POTS phone 30 at number 555-1212 is ringing, the ringing tone is transmitted from the PBS/PSTN via the IPRelay device 10 to the IPCourier device 26 and then to the user via the audio channel. Similarly, if PBX phone 28 at extension 7153 or phone 30 at number 555-1212 is busy, the busy tone is then sent from the PBX/PSTN via the IPRelay device 10 to the IPCourier device 26 for the user via the same audio channel. When PBX phone 28 at extension 7153 or POTS phone 30 at PSTN number 555-1212 is answered, the conversation between the user of the IPCourier device 26 and the PBX user of phone 28 or 30 is packetized and exchanged between the IPCourier device 26 and the IPRelay device 10 over the audio channel.

If the user of the IPCourier device 26 initiates the call termination and sends a release message via the CPS 12 to IPRelay device 10, the IPRelay device 10 will automatically go on hook upon receipt of the release message which completes the call tear down with the CPS 12. The IPRelay device 10 on-hook action triggers the PBX 14 to disconnect the IPRelay device 10 from the PBX phone 28 at extension 7153 or the POTS telephone 30 at PSTN number 555-1212. If on the other hand, the PBX 14 or PSTN user at telephone 30 initiates the call termination, phone 28 at extension 7153 or phone 30 at number 555-1212 then goes on-hook, and in this case since IPRelay device 10 is still off hook, the PBX 14 then presents a dial tone to the IPRelay device 10. Upon detecting the dial tone/special tone/inactivity time out (programmable for different PBX/KTS system with default being inactivity timeout), the IPRelay device 10 automatically sends a release message to the CPS 12 and then goes on-hook. The CPS 12 in turn sends a release message to the IPCourier device 26 to complete the call tear down.

Having described the IPCourier device 26 or IPShuttle devices 18, 20 of FIG. 1 calling the PBX phone 28 or PSTN phone 30, the reverse of a PBX phone 28 or PSTN phone 30 calling the IPCourier device 26 or an IPShuttle device 18, 20 will now be described. Actually, the procedures for a PBX or PSTN phone 28, 30 calling the IPCourier device 26 or IPShuttle device 18, 20 can be exactly the same as previously described. Suppose for example that the PBX phone 28 at extension 7153 or PSTN phone 30 at number 555-1212 is calling the IPCourier device 26 at extension 2004. In this scenario, the user of PBX phone 28 at extension 7153 dials 7150 or the PSTN user of phone 30 dials 214-7150(214 is the dialing prefix for PBX 14). Upon detecting ringing, the IPRelay device 10 automatically goes off-hook to answer the PBX or PSTN incoming call. The off-hook action triggered the IPRelay device 10 to send a setup message to the CPS 12 and the CPS then informs the IPRelay device 10 to provide a dial-tone by sending the IPRelay device 10 a Q.931 PSTN information message. At this point, the user of PBX phone 28 at extension 7153 or PSTN phone 30 at number 555-1212 should hear the dial tone and can then dial the IPCourier device 26 extension 2004. As the digits are being dialed, the IPRelay device 10 detects the DTMF tones and formats them into Q.931 information messages and sends them to the CPS 12 so that it can dial the IPCourier device 26. If the IPCourier device 26 is busy, the CPS 12 sends a Q.931 PSTN information message to the IPRelay device 10. Otherwise, it sends the IPRelay device 10 an alerting message and then a Q.931 PSTN information message. The IPRelay device 10 provides to line 1 (connecting to extension 7150) a busy tone upon receiving the Q.931 PSTN message or a ringing tone upon receiving an alerting and accompanying Q.931 PSTN information message. If the user of IPCourier device 26 user answers the call, the IPCourier device 10 then sends a connect message to the CPS 12 to accept the call. The CPS 12 then sends a connect message to the IPRelay device 10 which then stops providing the ringing tone to the PBX phone 28 at extension 7153 or the PSTN phone 30 at number 555-1212. At this point, a UDP audio connection is established between the IPRelay device 10 and the IPCourier device 26 and a conversation between the user of IPCourier device 26 and the user of the PBX phone 28 at extension 7153 or the PSTN phone 30 at number 555-1212 is established. The call tear down follows the same procedures as previously described.

Now suppose that a user of a KTS phone 34 user wants to place a call to PBX phone 28 at extension 7153 or PSTN phone 30 at number 555-1212. When the user of KTS phone 34 goes off hook and presses a button that corresponds to appearance 6000, the KTS IPShuttle device 18 detects off hook on line 1 in the same fashion as the IPCourier device 26 does for the previously explained examples. Thereafter, the rest of the procedures are the same as described previously for an IPCourier device 26 initiated call.

A similar scenario, suppose that the PBX phone 28 at extension 7153 or PSTN phone 30 at number 555-1212 is calling the KTS IPShuttle device 18 line 1, which has extension 6000. The procedures between the KTS IPShuttle device 18 and the IPRelay device 10 are the same as between the IPCourier device 26 and the IPRelay device 10 as previously described for a PBX or PSTN phone 28, 30 calling the IPCourier device 26 or IPShuttle device 18 (see above). The difference is that IPCourier device 26 rings its phone and the KTS IPShuttle device 18 rings line 1 which indirectly rings KTS phones 34, 36. The KTS user can then use any of the phones 34, 36 to answer the call by pressing the button that is associated with appearance 6000.

The previously described scenarios required two step dialing wherein the user must dial the IPRelay device 10 first, wait for the connection to be established and then dial the destination number. To reduce the two step dialing process to a single step of dialing, a hot-line feature can be introduced. For example, IPRelay device 10 can hot-line with the KTS IPShuttle device 18, that is configure line 1 of the IPRelay device 10 automatically to dial line 1 of the KTS IPShuttle device 18 and line 2 of the IPRelay device 10 to automatically dial line 2 of the KTS IPShuttle device 18 or other IPShuttle device 20 or IPCourier device 26. In the case of a hot-line from the IPRelay device to the KTS IPShuttle device 20, then the KTS IPShuttle device 20 may want to register with the CPS 12 as 7150 and 7151 to match the PBX extensions of IPRelay device 10 just mentioned. In this scenario, when the PBX phone 28 user calls 7150 or the PSTN phone 30 user calls 214-7150, line 1 of the IPRelay device 10 will be rung by PBX 14. Upon detecting the ringing tone, the IPRelay device 10 automatically goes off hook and dials the CPS 12 extension 7150, which is line 1 of the KTS IPShuttle device 20 because of the above-mentioned registration. If "7150" is busy, the CPS 12 will inform the IPRelay device 10 by means of the Q.931 PSTN information message to provide a busy tone. If "7150" is ringing, the CPS 12 will send an alert and a Q.931 PSTN information message to the IPRelay device 10 to play the ring-back tone. The busy or ring-back tone is then fed back to the user of PBX phone 28 or PSTN phone 30. If the KTS phone 34, 36 user answers the call, then the conversation between the KTS phone 34 or 36 user and the PBX phone 28 or PSTN phone 30 user is packetized and exchanged between the KTS IPShuttle device 18 and the IPRelay device 10 over the UDP audio channel. Call tear down follows the same procedures as described previously. Similarly, the two-step dialing process can be eliminated for users of the IPShuttle device 18 and the user of the IPCourier device 26 by configuring them to hot line with the IPRelay device 10.

Besides allowing the above-mentioned call establishment between a traditional PBX or KTS (centrex or hybrid system) and remote telephones connected to them via the Internet or an Intranet using a packetized channel as described above, it will also be advantageous according to the present invention to give access to features of the PBX, centrex or KTS systems to these remote users. Lately, hybrid equipment has been offered which falls into categories of both a key system and a PBX, and such hybrids offer features traditionally offered on PBXs only. But these features are, of course, not accessible to IP network users. However, according to the present invention, this can be done with a remote hook flash feature which allows a user with an IP terminal such as the IPCourier device 26 of FIG. 1 or even a POTS phone 22, 24 such as those shown in FIG. 1 connected to an IPShuttle terminal adapter device 20 to access the features available on an existing non-IP based PBX, centrex, KTS or hybrid systems. This remote hook flash feature allows an IP telephony user to use features available on a non-IP based PBX, centrex, KTS or hybrid system which otherwise is impossible. This allows investments in traditional PBXs, centrex, KTS or hybrid systems to be upgraded to permit deployment of IP telephony solutions.

Referring now to FIG. 2, a sequence of steps is shown as an example of how to carry out a method according to the remote hook flash of the present invention. The remote hook flash is initiated from one of the remote users shown in FIG. 1, e.g., a POTS phone 22, 24 or an IPCourier desktop telephone device 26. Suppose it is one of the POTS telephones 22, 24 shown in FIG. 1 connected to one of the lines 2002, 2003 connecting via the IP shuttle device 20 to the Internet or Intranet shown, that wishes to use some features supported by the PBX 14. For instance, the PBX 14 might support a speed dial feature. It should be realized that the discussion that follows is also applicable to a KTS system, a hybrid system, or a centrex system with such a feature that can be made accessible to IP terminals, according to the present invention.

Figure 2A:
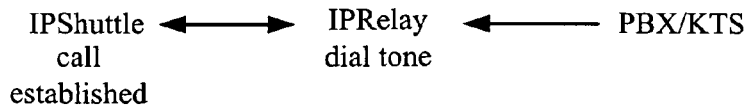
FIG. 2 shows a series of steps of a method initiated by a remote user to access PBX/KTS features available on the PBX/KTS systems of FIG. 1, for instance.

One of the POTS telephones 22, 24 connected to the IPShuttle device 20 via one of the lines 2002 or 2003 goes off hook and a call is established as shown in FIG. 2(a) between the IPShuttle device 20 and the IPRelay device 10 with a dial tone being sent from the PBX 14 to the IPRelay device 10 which in turn converts it to a packetized version thereof for the IPShuttle device 20 which in turn reconverts it back to a POTS dial tone for one of the POTS telephone sets 24, 22 on line 2002 or line 2003.

Figure 2B:
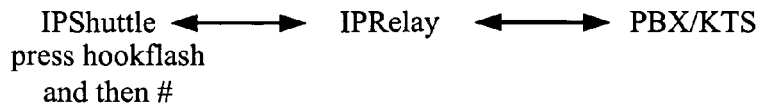
Figure 2C:
Figure 2D:
Figure 2E:

As shown in FIG. 2(b), at this point, the user of the POTS telephone 22 or 24 wishes to indicate a desire to access the speed dial feature by initiating a hook flash procedure. This just means that the user will momentarily depress the switch hook. It will be similarly accomplished by hitting a flash button on a telephone so equipped. The user also presses a key such as the pound key (as shown) or some other key sequence (including, e.g., 0–9, *, and #) following the hook flash. This key sequence or key is arbitrary and could be user configurable. For the IPCourier device 26, the activation mechanism can be a single configurable appearance key or special button that is built into the desktop phone.

The IPShuttle device 20 then sends a control message via the audio channel existing between the IPShuttle device 20 and the IPRelay device 10 as shown in FIG. 2(*c*). At this point in time, such has to be a proprietary implementation because there are no standards existing for such a feature. But it is possible in the future that an open standard could be defined. Sending a control message (for instance an RTP audio packet with a special header) from the IPShuttle device 20 to the IPRelay device 10 connected to the PBX 14 (end point-to-end point) is the most straightforward implementation. The end point could also be defined as an IP client terminal such as the IPCourier device 26 shown in FIG. 1. Alternatively, a control message (Q.931) could be sent to a gatekeeper and then the gatekeeper would forward the control message to the IPRelay device 10 or IPShuttle device 20. This would be required if the gatekeeper wanted to process the control message. In-band signaling could be used but it is currently viewed as disadvantageous because a DSP filter would be required (extra CPU processing required) and some codecs may have lossy compression.

Referring now to FIG. 2(*d*), the hook flash then is signaled from the IPRelay device 10 to the PBX 14. The user can then enter feature access codes as shown in FIG. 2(*e*) which are converted in the IPShuttle device 20 (or in the IPCourier device 26), sent to the IPRelay device 10 and thence onward to the PBX 14 for providing the feature to the remote extension. Besides speed dial, other features such as call forwarding can be implemented among others that will be known to those of skill in the art and which would normally be provided from a PBX, centrex or KTS system.

Figure 3:
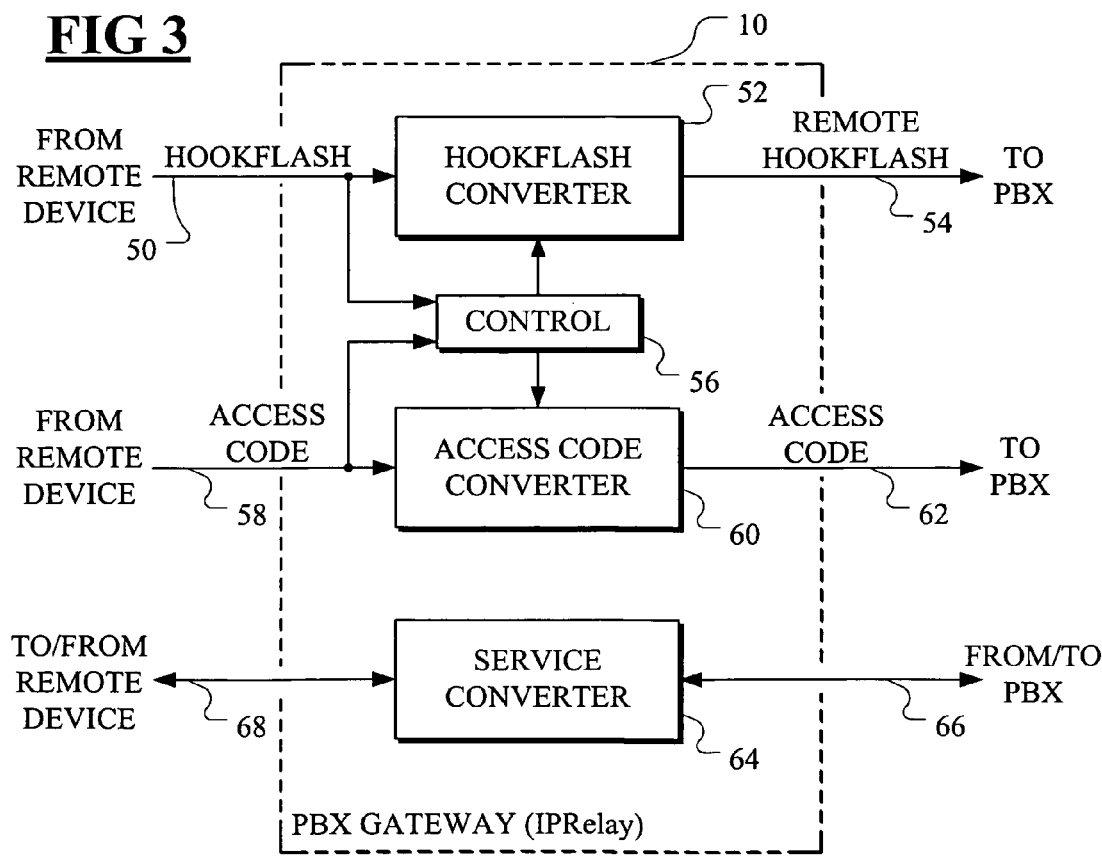
FIG. 3 shows a gateway (IPRelay) that enables a remote IP device to gain access to a service of a non-IP PBX as an extension thereof.

FIG. 3 shows a gateway such as the IPRelay device 10 of FIG. 1 that enables a remote IP device 20, 26 to gain access to services of a non-IP PBX 14. It is responsive to a hook flash signal on a line 50 from a remote device 20, 26 which has been initiated by a user at the device 26 or at a device 22, 24 connected thereto. The remote hook flash signal on the line 50 is packetized in an IP format and provided to a hook flash converter 52 which converts it to a non-IP format signal on a line 54 which is provided to the PBX 14 as controlled by a control module 56.

Following the remote hook flash, the user will enter an access code which is also provided through the internet or intranet of FIG. 1 in an IP format on a signal line 58 to an access code converter 60 also controlled by the controller 56 for converting of the access code to a non-IP format and for providing same on a signal line 62 to the PBX 14. From the point of view of the PBX, the user initiating the remote hook flash and access code is just a non-IP extension and is now ready to provide the requested service to and from the remote device. This can be accomplished over a service converter which converts non-IP signals on a line 66 from and to the PBX and likewise signals on a line 68 to and from the remote device. In this way, the gateway of FIG. 3 enables the remote device to gain access remotely to services of the PBX over an IP network.

To enable seamless integration of the IP telephony network features and PBX/centrex/KTS features, the access code converter 60 of FIG. 3 of the IPRelay device 10 shown in FIG. 2 can be used. The IPCS 38 of FIG. 1 can be used to configure the access code converter 60. IPCS 38 is an IP telephone network management server. It allows for user configuration of IP telephony devices. Then IPRelay device 10 can do feature access code mapping to the PBX 14 so that the PBX (or centrex or KTS) can understand the user-configurable code. This feature allows the users to configure their own access codes to the features on the PBX. An end-point such as the IPRelay device 10 maps the user codes into codes that the PBX, centrex or KTS system understands. Access codes can, for instance, be any combination of DTMF keys (0–9, *, #).

Each IP telephony device has an access code converter similar to access code converter 60 in FIG. 3. All feature access codes for IP telephony network features can be filtered at the IPShuttle device 20 (or in the IPCourier device 26), or by the IPRelay device 10, and then forwarded to the IPCS 38 in FIG. 1 which manages such features. All feature access codes for the PBX/centrex/KTS are processed by the IPRelay device 10, as described above. This mapping of features to the IP telephony network or PBX/centrex/KTS is transparent to the end user of devices 22, 24 or 26 of FIG. 1.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method comprising the steps of communicating between an internet protocol (IP) device over an IP network and a bridge connected to non-IP private branch exchange (PBX) equipment as a PBX extension of said PBX, said PBX providing telephony connections as well as telephony-related features to extensions connected thereto, which equipment is connected to a public switched telephone network (PSTN), by signaling from said IP device to said bridge with an access code indicative of a feature of said PBX equipment and by converting said access code to a non-IP protocol for accessing said feature of said non-IP PBX equipment by said IP device, wherein preceding said signaling with an access code, a remote hookflash is signaled from said P device to said bridge.

2. The method of claim 1, wherein said remote hookflash is signaled from a non-IP device connected to said IP device.

3. Method for accessing a feature of equipment connected to a public switched telephone network with an access signal code corresponding to said feature and initiated from a terminal, comprising the steps of:

signaling over an internet protocol (IP) network from said terminal to said relay device with a packetized hookflash signal to a relay device (10), converting said packetized hookflash signal at said relay device to a non-IP hookflash signal for signaling said equipment, transmitting said access code signal as a packetized signal over said internet protocol (IP) network to said relay device (10), and converting said packetized access code signal at said relay device to a non-IP access code signal for said accessing said feature.

4. The method of claim 3, wherein said hookflash signal and said access code are signaled from an P device (20) connected to said terminal (22, 24) intermediate the IP network and the terminal.

5. Telecommunications system having equipment providing telephony connections as well as telephony-related features accessible to a plurality of telephones connected as extensions thereof, said equipment for connection to a public switched telephone network (PSTN), said system further comprising an internet protocol (IP) relay device (10) connected as at least one extension of said equipment for converting at least voice and signaling between said PSTN and one or more P devices (18, 20, 26) in communication with said IP relay device over an IP network, said one or more IP devices for providing a remote access signal to said IP relay device over said IP network for accessing said features of said equipment as said at least one extension wherein said remote access signal is preceded by a remote hookflash signal that is relayed from said IP relay device to said equipment.

6. The system of claim 5, wherein said remote hookflash signal is initiated at a terminal connected to one of said IP devices.

7. The telecommunications system of claim 5, wherein said accessing said equipment is for accessing a feature of said equipment.

8. The telecommunications system of claim 5, wherein said accessing said equipment is for accessing POTS terminal (30) of said PSTN.

9. The system of claim 6, wherein said accessing said equipment is for accessing a feature of said equipment by said terminal.

10. The telecommunications system of claim 8, wherein said accessing said equipment is for accessing a POTS telephone (30) over said PSTN network from a terminal connected to one of said IP devices.

11. A gateway, comprising:
means responsive to a remote hookflash signal from a remote device over an internet protocol (IP) network for providing said hookflash signal in a non-IP format to equipment connected to a public switched telephone network (PSTN) for providing telephony connections as well as telephony-related features to telephones connected to said equipment; and
means responsive, subsequent to said hookflash signal, to an access code from said remote device over said IP network for providing said access code to said equipment in a non-IP format indicative of a feature provided by said equipment to extensions thereof whereby said gateway enables said remote device to gain access to said feature remotely over said IP network.

* * * * *